J. & C. REUSE.
RESILIENT WHEEL.
APPLICATION FILED SEPT. 26, 1913.

1,145,034.

Patented July 6, 1915.

UNITED STATES PATENT OFFICE.

JEAN REUSE AND CHARLES REUSE, OF HAL, BELGIUM.

RESILIENT WHEEL.

1,145,034.             Specification of Letters Patent.      Patented July 6, 1915.

Application filed September 26, 1913.   Serial No. 791,988.

*To all whom it may concern:*

Be it known that we, JEAN REUSE and CHARLES REUSE, subjects of the Kingdom of Belgium, residing at Quai au Charbon, Hal, in the Kingdom of Belgium, have invented certain new and useful Improvements in Resilient Wheels, of which the following is a specification.

This invention relates to resilient wheels of the kind described in our U. S. Patent No. 921,283 wherein the resiliency is obtained by means of blocks of soft india rubber of cylindrical shape, interposed between the rim and the hub. According to the construction described in the U. S. Patent No. 921,283, metal pins or the like are provided at regular intervals between these blocks and the inner walls of the casings wherein these blocks are located, for the purpose of distributing the pressure along the whole length of the said blocks. To permit of the introduction of these pins and to retain them in place at the desired distance from one another transverse grooves were formed upon the periphery of the blocks for their reception. These grooves had, however, the drawback that the contact of these pins with the metal wall of the casings gave rise to unpleasant jingling noises during the rotation of the wheels and to friction which by producing wear both of the metal and of the india rubber increased the jingling.

The present improvement has for its object to avoid this drawback and consists in inserting the metal pins or the like, wholly into the india rubber of the blocks near to the periphery of the latter so that neither the shank nor the ends of the pins or the like, will come into contact with the metal of the casings. Transverse notches or grooves may be formed between the pins in the periphery of the blocks so as to render the latter more compressible.

Figure 1:
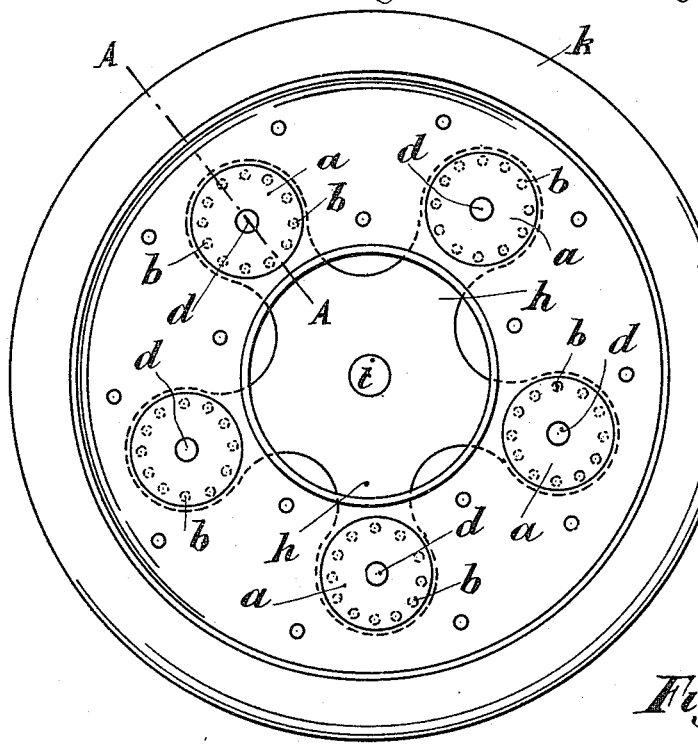
Figure 2:
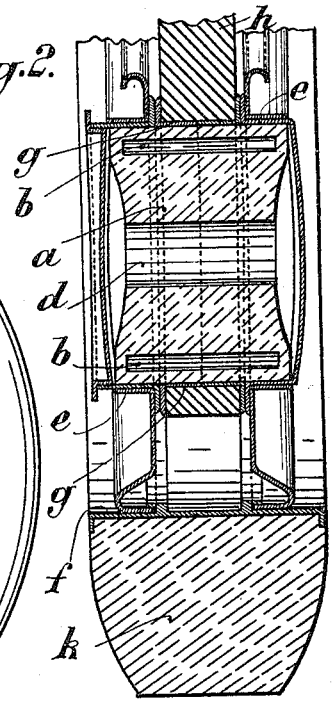
Figure 4:
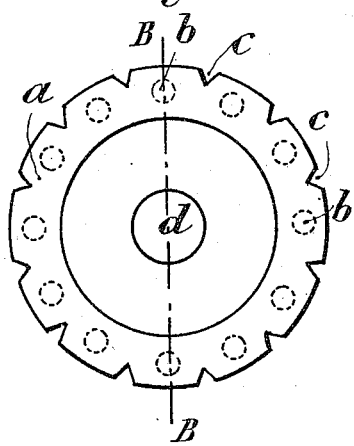
Figure 5:
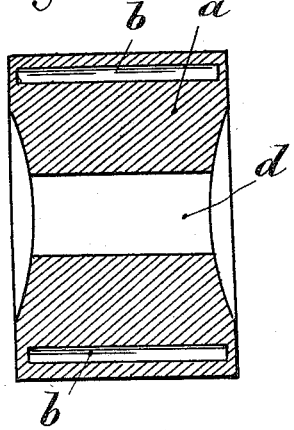
Figure 3:
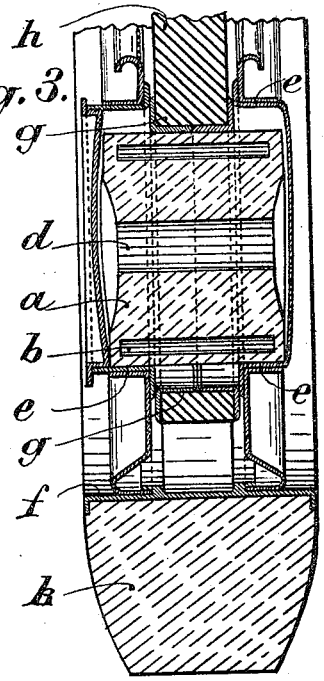

In the accompanying drawings: Figure 1 is a front view of a wheel constructed according to U. S. Patent No. 921,283 showing the blocks constructed in accordance with the present invention. Figs. 2 and 3 are transverse sections drawn on a larger scale through the line A—A, Fig. 1 showing a block in its normal and compressed states respectively. Fig. 4 is an end view and Fig. 5 a section through the line B—B, Fig. 4 of one of the rubber blocks detached.

In these figures, $a$ are the rubber blocks and $b$ the metal pins embedded therein near to the periphery, $c$, $c$ (Fig. 4) are notches or grooves formed in the blocks between the pins; $d$ is a central opening through the blocks.

$e$ are the boxes or casings integral with the rim $f$ and $g$ are the frames or rings integral with the spokes $h$ and hub $i$.

$k$ is the wheel tire.

As clearly shown in Figs. 2 and 3, pressure exerted on the middle portion of the rubber blocks $a$ by the frames or rings $g$ is evenly distributed throughout the whole length of said blocks by the embedded metal pins $b$ thus preventing the blocks from being sheared between the frames $g$ and the casings $e$, $e$.

What we claim and desire to secure by Letters Patent of the United States is:—

The combination with a resilient wheel comprising a rim and spokes and a plurality of india rubber blocks keying said rim and spokes together, of a plurality of metal pins each of a length less than the width of the rubber blocks, the said pins being totally embedded at regular intervals around the blocks adjacent the periphery thereof.

In testimony whereof we affix our signatures in presence of two witnesses.

JEAN REUSE.
CHARLES REUSE.

Witnesses:
 LEON PIÉRARD,
 CHAS. REY NUSMITH.

Copies of this patent may be obtained for five cents each, by addressing the "Commissioner of Patents, Washington, D. C."